(12) United States Patent
Münzenberger

(10) Patent No.: US 9,074,367 B2
(45) Date of Patent: Jul. 7, 2015

(54) ASSEMBLY FOR A LINE CONDUIT

(71) Applicant: Hilti Aktiengesellschaft, Schaan (LI)

(72) Inventor: Herbert Münzenberger, Wiesbaden (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 13/947,865

(22) Filed: Jul. 22, 2013

(65) Prior Publication Data

US 2014/0020315 A1    Jan. 23, 2014

(30) Foreign Application Priority Data

Jul. 23, 2012  (DE) .......................... 10 2012 212 832

(51) Int. Cl.
| | |
|---|---|
| *E04B 1/94* | (2006.01) |
| *A62C 2/06* | (2006.01) |
| *F16L 5/04* | (2006.01) |
| *E04G 15/06* | (2006.01) |

(52) U.S. Cl.
CPC ............... *E04B 1/947* (2013.01); *A62C 2/065* (2013.01); *F16L 5/04* (2013.01); *E04G 15/061* (2013.01)

(58) Field of Classification Search
CPC ....... E04F 17/08; E04G 15/061; E04B 1/947; F16L 5/00; F16L 5/04; F16L 5/10; H02G 3/22; H02G 3/0675; H02G 3/088; H02G 3/0412; A62C 2/065
USPC ................... 52/220.8, 219, 232, 220.1, 220.3
See application file for complete search history.

(56) References Cited

U.S. PATENT DOCUMENTS

| | | | | |
|---|---|---|---|---|
| 469,005 | A | * | 2/1892 | Anderson ...................... 126/317 |
| 1,983,840 | A | * | 12/1934 | Dohner .......................... 285/341 |
| 3,548,079 | A | * | 12/1970 | Wold et al. ................ 174/153 G |
| 3,761,601 | A | * | 9/1973 | Kaesser et al. ................ 174/659 |
| 3,830,957 | A | * | 8/1974 | Oberdiear ........................ 174/78 |
| 3,914,843 | A | * | 10/1975 | Antonacci .................. 29/890.14 |
| 3,948,545 | A | * | 4/1976 | Bonds ................................ 285/4 |
| 4,086,736 | A | * | 5/1978 | Landrigan .................... 52/220.8 |
| 4,221,092 | A | * | 9/1980 | Johnson .......................... 52/232 |
| 4,232,712 | A | * | 11/1980 | Squires .......................... 138/109 |
| 4,242,164 | A | * | 12/1980 | Skinner ...................... 156/304.1 |
| 4,243,835 | A | * | 1/1981 | Ehrenfels ....................... 174/483 |
| 4,261,598 | A | * | 4/1981 | Cornwall ........................ 285/56 |
| 4,304,079 | A | * | 12/1981 | Thorsten ....................... 174/483 |
| 4,433,847 | A | * | 2/1984 | Weinberg ...................... 277/342 |
| 4,538,389 | A | * | 9/1985 | Heinen ........................ 52/220.8 |

(Continued)

FOREIGN PATENT DOCUMENTS

| | | | |
|---|---|---|---|
| AU | 713645 | B2 | 12/1999 |
| DE | 102009048651 | A1 | 4/2001 |

(Continued)

*Primary Examiner* — James Ference
(74) *Attorney, Agent, or Firm* — McAndrews, Held & Malloy, Ltd.

(57) ABSTRACT

An assembly for a line conduit is configured to be molded into a construction part, such as a concrete casting. The assembly includes positioning module configured for fastening the assembly to a structure, such as a wall or casting. The assembly also includes a casting sheath and a fire protection module, which includes an intumescent fire protection element. The positioning module, the fire protection module and the casting sheath cooperate to form a line passage. The fire protection module includes accepts for a reversible fastening of the casting sheath and/or the positioning module.

19 Claims, 2 Drawing Sheets

(56) References Cited

U.S. PATENT DOCUMENTS

| | | | | |
|---|---|---|---|---|
| 4,547,623 A * | 10/1985 | Van Brunt et al. | | 174/359 |
| 4,619,087 A * | 10/1986 | Harbeke | | 52/220.8 |
| 4,623,170 A * | 11/1986 | Cornwall | | 285/4 |
| 4,627,647 A * | 12/1986 | Hauff | | 285/189 |
| 4,646,486 A * | 3/1987 | Hauff | | 52/1 |
| 4,669,244 A * | 6/1987 | Szoke | | 52/220.8 |
| 4,669,759 A * | 6/1987 | Harbeke | | 285/136.1 |
| 4,748,787 A * | 6/1988 | Harbeke | | 52/741.3 |
| 4,817,348 A * | 4/1989 | Wydra | | 52/220.8 |
| 4,848,043 A * | 7/1989 | Harbeke | | 52/1 |
| 4,850,385 A * | 7/1989 | Harbeke | | 137/75 |
| 4,888,925 A * | 12/1989 | Harbeke | | 52/232 |
| 4,918,761 A * | 4/1990 | Harbeke | | 4/252.4 |
| 4,976,457 A * | 12/1990 | Carter | | 285/136.1 |
| 5,017,024 A * | 5/1991 | Clark et al. | | 384/482 |
| 5,060,986 A * | 10/1991 | Carter | | 285/136.1 |
| 5,079,389 A * | 1/1992 | Nelson | | 174/505 |
| 5,103,609 A * | 4/1992 | Thoreson et al. | | 52/232 |
| 5,129,201 A * | 7/1992 | Robertson et al. | | 52/232 |
| 5,144,777 A * | 9/1992 | Fishel et al. | | 52/144 |
| 5,155,957 A * | 10/1992 | Robertson et al. | | 52/232 |
| 5,237,129 A * | 8/1993 | Obara | | 174/667 |
| 5,263,746 A * | 11/1993 | Cornwall | | 285/136.1 |
| 5,347,767 A * | 9/1994 | Roth | | 52/1 |
| 5,351,448 A * | 10/1994 | Gohlke et al. | | 52/1 |
| 5,390,465 A * | 2/1995 | Rajecki | | 52/741.3 |
| 5,405,172 A * | 4/1995 | Mullen, Jr. | | 285/92 |
| 5,406,032 A * | 4/1995 | Clayton et al. | | 174/151 |
| 5,452,551 A * | 9/1995 | Charland et al. | | 52/232 |
| 5,543,582 A * | 8/1996 | Stark et al. | | 174/653 |
| 5,680,856 A * | 10/1997 | van Dijk | | 126/85 B |
| 5,798,910 A * | 8/1998 | Holbeche et al. | | 361/809 |
| 5,927,892 A * | 7/1999 | Teh-Tsung | | 403/259 |
| 5,953,872 A * | 9/1999 | MacMillian et al. | | 52/220.8 |
| 6,141,915 A * | 11/2000 | Andersen et al. | | 52/1 |
| 6,180,882 B1 * | 1/2001 | Dinh | | 174/655 |
| 6,284,976 B1 * | 9/2001 | Pulido et al. | | 174/77 R |
| 6,314,692 B1 * | 11/2001 | Munzenberger et al. | | 52/220.1 |
| 6,336,297 B1 * | 1/2002 | Cornwall | | 52/232 |
| 6,357,188 B1 * | 3/2002 | Lee et al. | | 52/220.8 |
| 6,394,464 B1 * | 5/2002 | Moreau | | 277/603 |
| 6,470,635 B2 * | 10/2002 | Cornwall | | 52/220.8 |
| 6,643,985 B2 * | 11/2003 | Munzenberger | | 52/232 |
| 6,694,684 B2 * | 2/2004 | Radke et al. | | 52/232 |
| 6,752,361 B2 * | 6/2004 | Chou | | 248/74.1 |
| 6,792,726 B1 * | 9/2004 | Price | | 52/220.8 |
| 6,941,714 B2 * | 9/2005 | Nakamura | | 52/395 |
| 7,080,486 B2 * | 7/2006 | Radke et al. | | 52/98 |
| 7,635,110 B2 * | 12/2009 | Galasso et al. | | 248/200 |
| 7,810,847 B2 * | 10/2010 | Cornwall | | 285/230 |
| 7,877,941 B2 * | 2/2011 | Fischer et al. | | 52/220.8 |
| 8,393,121 B2 * | 3/2013 | Beele | | 52/220.8 |
| 8,505,251 B1 * | 8/2013 | Scruggs | | 52/220.8 |
| 2001/0001355 A1 * | 5/2001 | Shimizu | | 52/220.1 |
| 2001/0004023 A1 * | 6/2001 | Munzenberger et al. | | 174/77 R |
| 2002/0027325 A1 * | 3/2002 | Kogler et al. | | 277/315 |
| 2002/0032996 A1 * | 3/2002 | Cornwall | | 52/220.8 |
| 2003/0167712 A1 * | 9/2003 | Robertson | | 52/232 |
| 2003/0172603 A1 * | 9/2003 | McKesson | | 52/232 |
| 2004/0168398 A1 * | 9/2004 | Sakno et al. | | 52/741.4 |
| 2007/0283644 A1 * | 12/2007 | Fischer et al. | | 52/288.1 |
| 2009/0133925 A1 * | 5/2009 | Albert et al. | | 174/72 A |
| 2009/0218130 A1 * | 9/2009 | Monden et al. | | 174/505 |
| 2009/0320392 A1 * | 12/2009 | Nowoczin et al. | | 52/220.8 |

FOREIGN PATENT DOCUMENTS

| | | |
|---|---|---|
| DE | 102005000146 A1 | 5/2007 |
| DE | 102008000420 A1 | 9/2009 |

* cited by examiner

ASSEMBLY FOR A LINE CONDUIT

CROSS-REFERENCE TO RELATED APPLICATIONS

The present application claims priority to German Patent Application No. DE 10 2012 212 832.8, filed Jul. 23, 2012, which is hereby incorporated by reference herein in its entirety.

BACKGROUND

The present technology relates to an assembly for a line conduit to be molded in a part, particularly made from concrete, comprising a positioning module to fasten the assembly at a wall or a casting, a fire protection module, which comprises an intumescent fire protection element, and an oblong casting sheath, which jointly form a passage for a line.

Line conduits are used in the production of construction parts, made from concrete or another liquid building material, in order to provide clear wall or ceiling passages for lines, for example, wires or pipelines, or to integrate them here. The line conduits are positioned in a mold, into which the liquid building material is filled, and they keep a clearance in the wall or the ceiling when the building material is filled in.

The line conduits may be removed after the building material has cured. Frequently, however, they are left in the wall and additional elements, for example, seals or fire prevention elements, are arranged therein, which in case of a fire can close the passage in the wall or the ceiling. The fire protection element may comprise an intumescent material, which increases its volume under the influence of heat and this way closes the wall passage.

An assembly of such a line conduit should be flexible in its use, so that on site a quick adjustment to the various thicknesses of the component is possible and/or the fire prevention element can be positioned arbitrarily within the passage. On the other hand, the assembly must be easily handled, ideally assembled without the use of tools.

BRIEF SUMMARY

Certain aspects of the present technology relate to an assembly for a line conduit which allows a quick and flexible adjustment of the assembly to the desired installment conditions, but can easily be handled.

According to at least some embodiments of the present technology, an assembly is provided for the line conduit to be molded in a construction part, particularly made from concrete. The assembly includes a positioning module for fastening the assembly at a wall or a casting, a fire protection module with an intumescent fire protection element, and an oblong casting sheath, which jointly form a passage for a line. Accepts may be provided at the fire protection module for a reversible fastening of the casting sheath and/or the positioning module.

In prior art, either different prefabricated line conduits are provided for different applications or the fire protection module is produced separately from the sheath, which defines a passage, and subsequently assembled therein. The assembly according to the present technology offers the advantage that the assembly can be easily assembled on site because no additional connection elements are required. By exchanging the casting sheath or the positioning module, a simple adjustment to the installation conditions is possible. By a suitable positioning module, for example, an adjustment to arbitrary underground conditions is possible, while by an appropriate length of the casting sheath, an adjustment is possible to the desired thickness of the construction part.

For example, the fire protection module can be embodied annularly or cylindrically, so that it can entirely encompass a line in the circumferential direction and the passage can quickly and reliably be closed in case of a fire. The accepts are preferably provided at the axial faces of such an embodiment, so that the positioning module and the casting sheath can easily be assembled in the longitudinal direction at the fire protection module and here a cylindrical passage is formed by the three elements.

An anchoring element may be provided at the fire protection module. The anchoring element may comprising metal and may extend e.g., radially outwardly, from the fire protection element. The anchoring element may be embodied such that it also extends into the expanded fire protection element. Thus, via the anchoring element, the fire protection module is stabilized in the assembly and/or in the passage such that, after activation and expansion, it is held reliably in its position in the passage and the passage can be sealed, even under great stress, for example, by a fire fighting—water jet impinging the fire protection element.

This anchoring element may be embodied annularly, for example, and extend in the circumferential direction around the fire protection module so that it is circumferentially anchored in the component and cannot be displaced.

In order to achieve additional sealing of the passage, independent from the fire protection module, a sealing membrane may be provided at the inside of the assembly. In some embodiments the sealing element may be provided at the fire protection module and may be made, for example, from ethylene propylene diene rubber (EPDM). The sealing membrane may be constructed to seal the passage against moisture, dust, or noise for example.

The assembly may additionally comprise a reinforcement sheath, which covers the fire protection module in the circumferential direction and/or at least partially at the faces. This reinforcement sheath serves, on the one hand, to protect the fire protection module during the production of the component so that the fire protection module cannot be damaged by the liquid building material. On the other hand, the fire protection module serves for stabilization in order to reinforce the accepts at the fire protection module for the positioning module and the casting sheath so that the assembly is embodied in a more stable fashion. The reinforcement sheath may, for example, be connected to the fire protection module and/or adhered thereto. The fire protection module may, for example, be injection molded in the reinforcement sheath and thus be connected with said part in a material-to-material connection.

In order to allow a simple plug-in connection of the modules of the assembly, the accepts may be formed, for example, by annular slots at the faces of the fire protection modules so that the positioning module as well as the casting sheath can easily be inserted into the fire protection module.

The casting sheath and/or the positioning module may be embodied cylindrical. In particular, they may be embodied adjustable with regard to their length so that a simple and quick adjustment of the assembly to the desired installation conditions is possible, for example, the position of the fire protection module in the component or the thickness of the part.

At the end opposite the fire protection module, the casting sheath and the positioning module may be closed via an end cap so that, during the production of the part, any penetration of the liquid building material into the passage is prevented.

At the face away from the fire protection module a radially projecting assembly flange may be provided at the positioning module by which the assembly can be fastened and/or fixed at a mold to cast the part, for example, a concrete casting.

In some embodiments, this flange may comprise positioning elements, which allow a precise fixation and/or adjustment of the assembly to the mold. They may represent particularly adjusted devices in order to fasten the assembly on an uneven underground, for example, a troughed sheet, or on castings for prefabricated concrete parts. For example, in some embodiments at least some of the positioning elements may comprise a magnet which can adhere to an element that can be magnetized.

In some embodiments, the casting sheath and/or the positioning module may be made from plastic or cardboard, which allows a simple and cost-effective production.

In some embodiments of the assembly, the positioning module may be a cylindrical solid body. In order to allow a simple plug-in connection of the positioning module and the fire protection module, the positioning module may be provided with a brim and/or a flange. Here, the primary body of the positioning module is dimensioned such that it can be inserted into the passage opening formed by the fire protection module, and the fire protection module contacts the brim and/or the flange. The diameter of the solid body is beneficially selected such that it completely fills and particularly seals the passage opening formed by the fire protection module and perhaps also the casting sheath. This prevents any excessively deep insertion of the positioning module during the composition of the assembly and/or any displacement of the positioning module in the direction of the fire protection module during the generation of the component and thus ensures the position of the fire protection module inside the passage opening.

By the thickness of the brim and/or the flange, the insertion thickness of the fire protection module in the component to be produced can be selected such that an easy and quick adjustment of the assembly to the desired installation conditions is possible.

In this embodiment, the positioning module may be a beneficial plastic, such as polystyrene.

In some embodiments, the positioning module may, alternatively, be formed like a plate, upon which the fire protection module can simply be placed. In order to fixate the position of the fire protection module, the plate may be provided with a cylindrical projection with the fire protection module being plugged thereon and thus its position being fixed.

In the two most recently mentioned embodiments, the positioning module may be fixated, for example, via fastening elements, such as nails, to the casting.

DETAILED DESCRIPTION OF THE INVENTION

Figure 1:
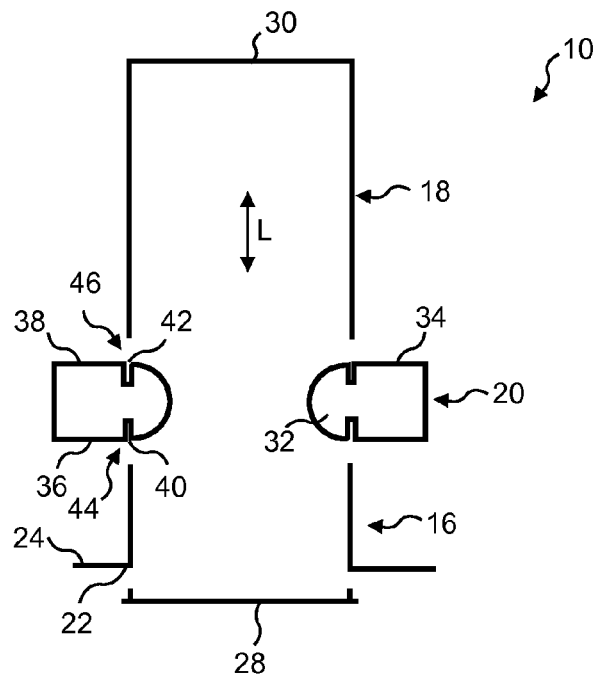
FIG. 1 is an exploded illustration of an assembly according to certain embodiments of the present technology.
Figure 2A:
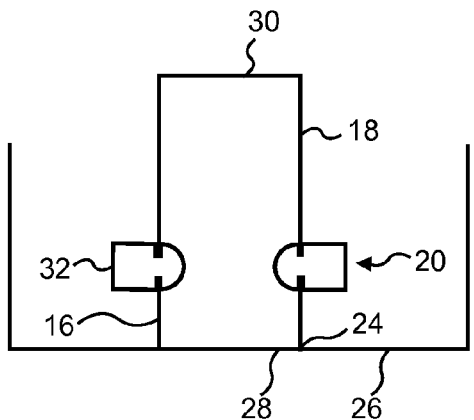
FIGS. 2a and 2b are various production steps to produce a component with the assembly according to certain embodiments of the present technology.
Figure 2B:
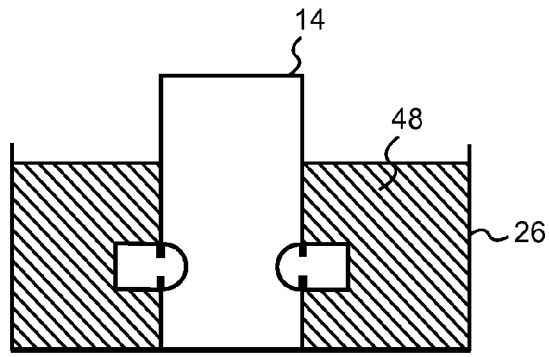
Figure 3:
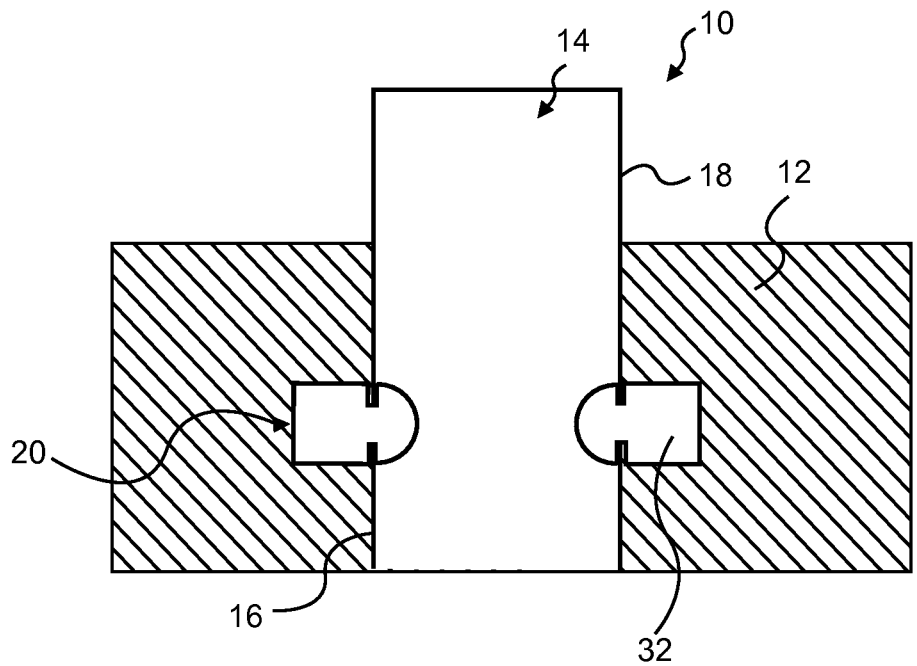
FIG. 3 is a component with an assembly according to certain embodiments of the present technology.

FIG. 1 shows schematically an assembly 10 for a line conduit in a component 12 (also see FIG. 3). The component 12 is produced from a liquid material 48, which is inserted into a mold 26 (see FIGS. 2a and 2b) and cures therein. During the production of the component 12, the assembly 10 preserves a passage 14 through which, after the component 12 has been produced, lines can be guided, for example, pipelines or wires. Additionally, this assembly 10 can seal the passage 14 and this way, for example, in case of a fire, prevent the penetration of smoke, fire, or moisture.

The assembly 10 comprises a positioning module 16, as shown in the following, which serves for the positioning and/or fixation of the assembly 10 during the production of the component 12 as well as a casting sheath 18 and a fire protection module 20.

The positioning module 16 is essentially embodied cylindrical and comprises an assembly flange 24 at its end 22, facing away from the fire protection module 20. The assembly flange 24 can be fastened and/or fixated on or in the mold 26 in order to determine the position of the passage 14.

The casting sheath 18 is also embodied cylindrical and may be embodied in a longitudinally adjustable fashion, similar to the positioning module 16. The casting sheath 18 and the positioning module 16 may be closed at their end facing away from the fire protection module 20, by respective removable end cap 28, 30. The end caps 28, 30 can be removed after the production of the component 12 so that the passage 14 is freely accessible.

Figure 4:
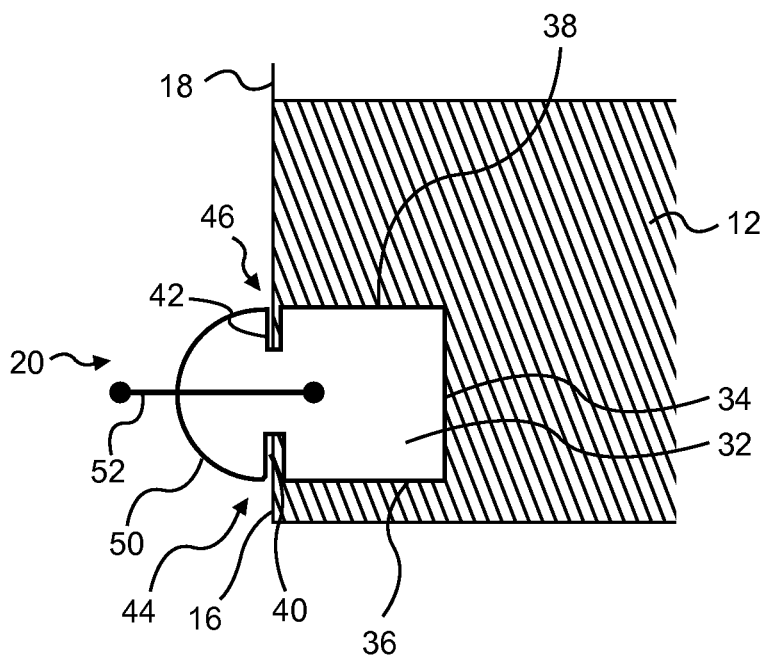
FIG. 4 is a detail of the fire protection module of the assembly of FIG. 1.

As is particularly discernible in FIG. 4, the fire protection module 20 comprises a fire protection element 32 made from an intumescent material as well as a reinforcement sheath 34, which is embodied with a U-shaped cross-section and covers the fire protection element 32 in the circumferential direction and partially at the faces. The fire protection element 32 is connected to a reinforcement sheath 34 in a material-to-material connection, for example, by way of adhesion or by injecting material of the fire protection element 32 into the reinforcement sheath 34.

When the intumescent material of the fire protection element 32 is heated, the intumescent material expands. Due to the fact that the fire protection module 20 is arranged in the passage 14, the fire protection element 32 seals the passage 14 by way of foaming so that any penetration by fire or smoke is prevented.

Accepts 44, 46, formed by annular slots 40, 42, are each provided at the faces 36, 38 of the fire protection module 20 into which the positioning module 16 and/or the casting sheath 18 can be inserted in the longitudinal direction L.

In order to produce a component 12 the positioning module 16 is inserted into the first accept 44 and the oblong casting sheath 18 into the second accept 46 (FIG. 2a) and the end caps 28, 30 are placed thereon. This way, a closed passage 14 is formed into which no liquid material can flow.

Subsequently, this component 10 is fixated at the mold 26 by the assembly flange 24 of the positioning module 16 being fastened on the mold 26. This may occur, for example, by additional fastening elements, for example, using screws or nails, which project through bore holes at the assembly flange 24 into the mold 26.

Alternatively, cooperating positioning elements may be provided at the assembly flange 24 and at the mold 26. For example, a magnetic element may be provided at the assembly flange 24. The mold 26 may be produced at least partially from a material that can be magnetized or comprises positioning elements that can be magnetized, so that magnetic elements of the assembly 10 adhere magnetically to the mold 26. The magnet may also be provided at the mold 26 so that the flange 24 and/or the positioning module 16 show no magnetic features after the installation. The positioning module 16 and/or the assembly flange 24 may also be fastened prior to the composition of the assembly 10 at the mold 26.

After the alignment and fixation of the assembly 10 at the mold 26, the mold 26 is filled with a liquid building material 48 (FIG. 2b), for example concrete, which cures after being inserted. After the building material 48 has cured, the mold 26 is removed, with in the exemplary embodiment shown the positioning module 16 together with the mold 26 and the end cap 28 being removed (FIG. 3). It is also possible that the positioning module 16 remains in the component 12 and only the end cap 28 is removed.

Subsequently, the end cap 30 of the casting sheath 18 is removed so that the passage 14 is freely accessible and a line can be guided through the passage 14.

Due to the fact that this assembly 10 is designed in a modular fashion, a quick and simple adjustment is possible to the desired installation conditions. By an appropriate selection of the casting sheath 18, an adjustment of the assembly 10 to the desired thickness of the component 12 is possible. Additionally, by exchanging the positioning module 16, the position of the fire protection module 20 can be varied in the component 12. It is also possible that a longitudinally adjustable casting sheath 18 and/or a longitudinally adjustable positioning module 16 are used.

Depending on the desired sealing requirements for the assembly 10 and/or the line conduit, for example, the fire protection module 20 can be selected accordingly, or additional sealing measures can be installed.

FIG. 4 shows a second embodiment of a fire protection module 20, as an example. The design of this fire protection module 20 is essentially equivalent to the previously shown exemplary embodiment. The fire protection module 20 additionally comprises an annularly formed anchoring element 50, which extends in the radial direction into the fire protection element 32, as well as a sealing membrane 52, which extends into the passage 14.

The anchoring element 50 is embodied such that it extends both in the non-expanded state as well as in the expanded state of the fire protection element 32 into it and is anchored therein. If applicable, the anchoring element may be deformed jointly with the fire protection element in the passage 14. By the anchoring element 50 the fire protection element 32 is particularly stabilized in the expanded state in the passage 14 such that it can also withstand major stress, for example, a water jet impinging the fire protection element 32, and a reliable sealing of the passage 14 is ensured.

The sealing membrane 52 may prevent the penetration of dust, liquids, etc. independent from the function of fire protection. The sealing membrane 52 may be produced, for example, from an ethylene propylene diene rubber (EPDM), which ensures a permanent water seal of the membrane.

In an alternative embodiment of the assembly flange 24, the positioning module 16 may be constructed from a foam block, which is arranged inside the passage 14. Such a foam block can simply be placed upon the mold 26. Subsequently, the assembly 10 can be placed upon this foam block and fixated thereon. The foam block additionally fulfills the function of the end cap so that an additional part can be waived, here.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. An assembly for a line conduit, the assembly comprising:
    a positioning module configured to allow the assembly to be fastened to a structure;
    a casting sheath; and
    a fire protection module comprising an intumescent fire protection element having an upper face and a lower face;
    wherein the upper face includes an upper annular slot configured to receive a lower end of the casting sheath;
    wherein the lower face includes a lower annular slot configured to receive an upper end of the positioning module; and
    wherein the positioning module, the fire protection module and the casting sheath are configured to form a line passage when the lower end of the casting sheath is received by the upper annular slot of the intumescent fire protection element and the upper end of the positioning module is received by the lower annular slot of the intumescent fire protection element.

2. An assembly according to claim 1, wherein the fire protection module is cylindrically shaped.

3. An assembly according to claim 1, wherein the fire protection module includes at least one anchoring element which extends outwardly from the intumescent fire protection element.

4. An assembly according to claim 3, wherein the anchoring element is annularly shaped and extends in a circumferential direction around the intumescent fire protection element.

5. An assembly according to claim 1, wherein the fire protection module comprises a sealing membrane made from ethylene propylene diene rubber.

6. An assembly according to claim 1, wherein the fire protection module further comprises a reinforcement sheath covering the fire protection module in a circumferential direction and at least partially the upper face and the lower face.

7. An assembly according to claim 1, further comprising:
    an upper end cap configured to mate with and close an upper end of the casting sheath; and
    a lower end cap configured to mate with and close a lower end of the positioning module.

8. An assembly according to claim 7, wherein at least one of the casting sheath and the positioning module are longitudinally adjustable.

9. An assembly according to claim 1, wherein the positioning module is formed from a cylindrical solid body.

10. An assembly according to claim 1, wherein the positioning module comprises a radially projecting assembly flange at a face opposite the fire protection module.

11. An assembly according to claim 10, wherein positioning elements are provided at the assembly flange.

12. An assembly according to claim 1, wherein:
    the casting sheath is made from one or more materials selected from a group of materials comprising plastic and cardboard; and
    the positioning module is made from one or more materials selected from a group of materials comprising plastic and cardboard.

13. An assembly for a line conduit, the assembly comprising:
    a positioning module having an upper end and a lower end, the lower end configured to allow the assembly to be fastened to a structure;
    a casting sheath having an upper end and a lower end; and a fire protection module comprising an intumescent fire protection element, an upper end and a lower end, the upper end including an upper slot configured to receive the lower end of the casting sheath and the lower end including a lower slot configured to receive the upper end of the positioning module;

wherein the positioning module comprises a first central passage extending from the upper end to the lower end of the positioning module;

wherein casting sheath comprises a second central passage extending from the upper end to the lower end of the casting sheath;

wherein fire protection module comprises a third central passage extending between the upper end and the lower end of the fire protection module; and wherein the first central passage, the second central passage, and the third central passage define a line passage configured to permit at least one line to pass through the assembly when the lower end of the casting sheath is received by the upper slot of the fire protection module and the upper end of the positioning module is received by the lower slot of the fire protection module.

14. An assembly according to claim 13, wherein:
the lower end of the casting sheath and the upper end of the positing module are both cylindrically shaped; and
the upper slot and the lower slot in the intumescent fire protection element are annular slots.

15. An assembly according to claim 13, further comprising at least one anchoring element which extends radially outwardly from the fire protection element.

16. An assembly according to claim 15, wherein:
the anchoring element and the fire protection element are both annularly shaped; and
the anchoring element extends in a circumferential direction around the intumescent fire protection element.

17. An assembly according to claim 13, wherein the fire protection module further comprises a reinforcement sheath covering the fire protection module in a circumferential direction and at least partially the upper end and the lower end of the fire protection module.

18. An assembly according to claim 13, further comprising:
an upper end cap connectable to the upper end of the casting sheath to close off the upper end of the second central passage; and
a lower end cap connectable to the lower end of the positioning module to close off the lower end of the first central passage.

19. An assembly according to claim 13, wherein at least one of the casting sheath and the positioning module is longitudinally adjustable.

* * * * *